United States Patent
Yuhara et al.

(10) Patent No.: US 6,548,804 B1
(45) Date of Patent: *Apr. 15, 2003

(54) APPARATUS FOR DETECTING AN OBJECT USING A DIFFERENTIAL IMAGE

(75) Inventors: Hiromitsu Yuhara, Saitama (JP); Masayuki Habaguchi, Saitama (JP); Akira Terauchi, Saitama (JP); Masakazu Saka, Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,231

(22) Filed: Sep. 15, 1999

(30) Foreign Application Priority Data

Sep. 30, 1998 (JP) ............................ 10-278346

(51) Int. Cl.$^7$ ................................................ G01N 21/86

(52) U.S. Cl. ............... 250/221; 250/559.32; 250/208.1; 382/199; 348/700

(58) Field of Search .............................. 250/208.1, 221, 250/559.36, 559.29, 559.3, 559.32, 559.39; 356/390, 611, 613; 382/100, 104, 151, 154, 199, 107, 103; 701/28, 45; 348/700, 135

(56) References Cited

U.S. PATENT DOCUMENTS

| | | | | | |
|---|---|---|---|---|---|
| 4,625,329 A | * | 11/1986 | Ishikawa et al. | ............ | 382/104 |
| 4,783,833 A | * | 11/1988 | Kawabata et al. | .......... | 382/107 |
| 5,366,241 A | | 11/1994 | Kithil | .......................... | 280/735 |
| 5,528,698 A | * | 6/1996 | Kamei et al. | ................ | 382/100 |
| 5,987,154 A | * | 11/1999 | Gibbon et al. | .............. | 382/115 |

FOREIGN PATENT DOCUMENTS

| | | | |
|---|---|---|---|
| DE | 69014840 T2 | 5/1995 | |
| EP | 400 998 A2 | 12/1990 | |
| JP | 5-10084 | 2/1993 | ............ A47C/7/38 |
| JP | 8-268220 | 10/1996 | ........... B60R/21/32 |

* cited by examiner

Primary Examiner—Que T. Le
Assistant Examiner—Thanh X. Luu
(74) Attorney, Agent, or Firm—Lahive & Cockfield, LLP

(57) ABSTRACT

An object detecting apparatus including an imaging section, an extracting section for extracting edge images from image signals supplied from the imaging section, a forming section for forming a differential image between a first edge image extracted from an image signal that has been picked up for an object at a certain time and a second edge image extracted from an image signal that has been picked up for the same object at a later time, and a detecting section for detecting the object on the basis of the differential image. With the object detecting apparatus, portions of a background without motion that are contained in the edge images are eliminated to produce edge images that only relate to the object that is substantially in motion. As a result, information can be efficiently obtained that relates to the state, position and otherwise of the object in motion.

12 Claims, 10 Drawing Sheets

ORIGINAL IMAGE

AFTER EDGE EXTRACTION

CURRENT EDGE IMAGE

PREVIOUS EDGE IMAGE
(33msec BEFORE)

DIFFERENTIAL IMAGE

CUT IMAGE AREA AS DIVIDED INTO
SMALLER AREAS

BINARIZED SMALLER AREAS

CUT IMAGE AREA AS DIVIDED INTO
FIVE RECTANGLES

ORIGINAL IMAGE

TIME DIFFERENTIAL IMAGE OF EDGES

IMAGE DETECTING CENTER OF CIRCLE
( FLAGS STOOD AT WHITE DOTS )

APPARATUS FOR DETECTING AN OBJECT USING A DIFFERENTIAL IMAGE

BACKGROUND OF THE INVENTION

1. Field of the Invention

The present invention relates to an apparatus for detecting an object the image of which is taken with an imaging apparatus. More specifically, the invention relates to an apparatus capable of detecting an object in motion by deleting still portions from the image of an object.

2. Description of the Related Art

With a view to enhancing the safety and comfort of vehicles such as automobiles, it has recently been proposed that the passenger occupancy of vehicles and the state of passengers be detected and control be performed in accordance with the obtained information. A typical example of this approach is the control of an air bag device that is installed on a vehicle and activated upon crash. The air bag device is required to operate optimally in accordance with the presence or absence of a passenger, whether the passenger is an adult or a child, the posture of the passenger on the seat, the position of the head of the passenger and other conditions.

Japanese Patent Unexamined Publication No. Hei. 8-268220 describes the use of a plurality of passenger detecting sensors in an automobile to detect various states of passengers such as a standing child passenger and a passenger who is holding out a hand so that the action of an air bag device is controlled in accordance with the detected state of a passenger.

Further, Japanese Patent Examined Publication No. Hei. 5-10084 describes imaging the head of the driver of an automobile with a CCD imaging device, calculating the distance to a peculiar point to determine the position of the back of the driver's head and automatically adjusting the position of a head rest to fit the thus determined position of the back of the driver's head.

However, a problem with the above related art is that it is impossible to extract only the passenger-related image signals from the image signals obtained with the imaging device and that therefore no adequate information about the state, position and otherwise of passengers can be obtained in spite of the complex calculations that are performed.

SUMMARY OF THE INVENTION

An object, therefore, of the present invention is to detect portions of an object that are in motion from the image signals obtained with an imaging device.

Another object of the invention is to provide an object detecting apparatus that is capable of outputting adequate information about the state of passengers in a vehicle.

In order to achieve the above objects, according to the invention, there is provided an object detecting apparatus comprising: imaging means for imaging an object; extracting means for extracting edge images from image signals supplied from the imaging means; forming means for forming a differential image between a first of the edge images and a second of the edge images as extracted from image signals that have been picked up for the object at different times; and detecting means for detecting a state of the object on the basis of the formed differential image.

According to the object detecting apparatus of the invention, there is taken the difference between the first and second edge images as extracted from image signals that have been picked up at different times and, hence, the image in the still portions of the two images is eliminated and only the image portions in motion are extracted. Thus, portions of the background without motion that are contained in the edge images are eliminated to produce edge images that only relate to the object that is substantially in motion. As a result, information can be efficiently obtained that relates to the state, position and otherwise of the object in motion.

BRIEF DESCRIPTION OF THE DRAWINGS

FIG. 6 is a diagram showing the binary distribution of the small areas;

DETAILED DESCRIPTION OF THE PREFERRED EMBODIMENT

Figure 1:
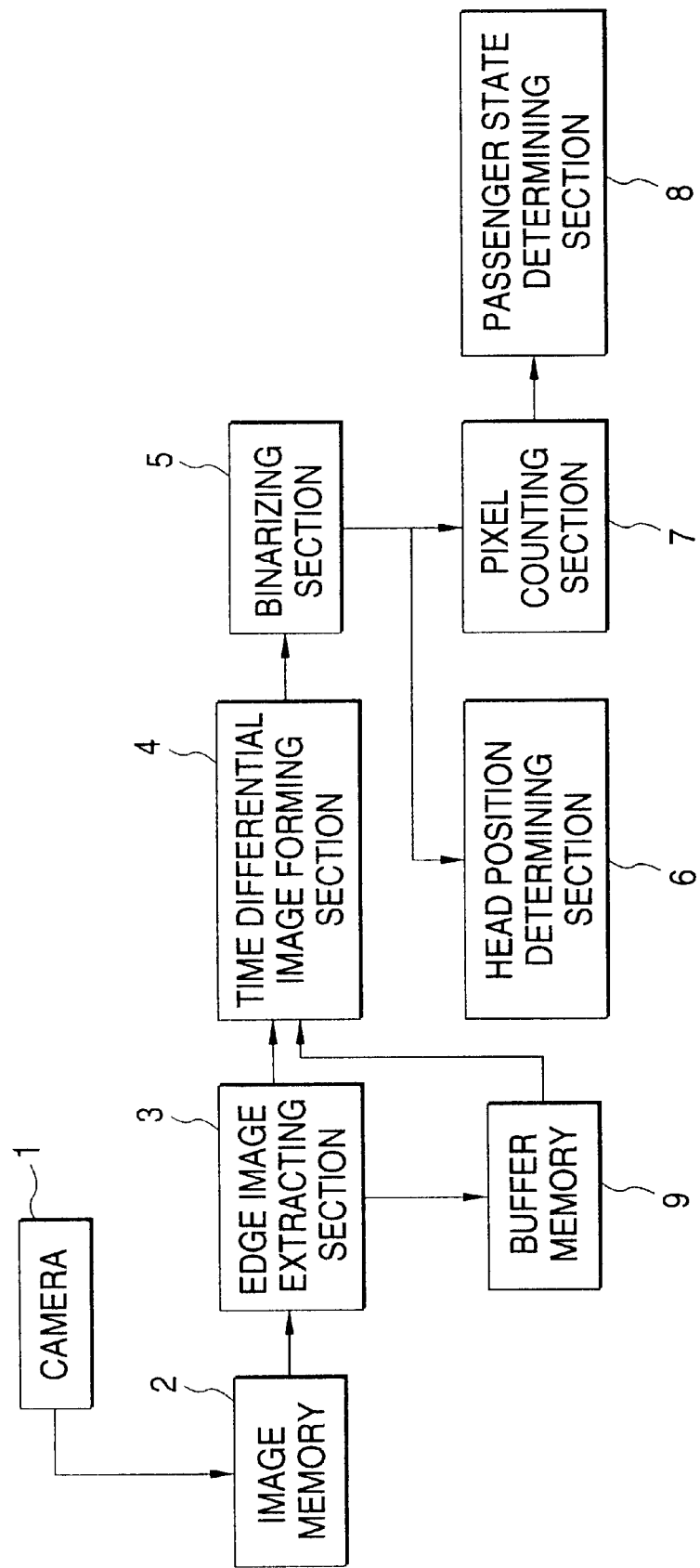
FIG. 1 is a block diagram showing the general layout of a passenger state detecting apparatus according to an embodiment of the invention.

An embodiment of the invention will now be described taking a passenger detecting apparatus on a vehicle as an example with reference to the accompanying drawings. Referring first to FIG. 1, camera 1 is an imaging device typically using a two-dimensional CCD array and is installed in the upper front portion of the vehicle's cabin so as to take the image of a driver or a passenger sitting next to the driver. Preferably, in order to permit use at night, an infrared light source is provided near the camera 1 so that the viewing area is illuminated with an infrared radiation in the non-visible range. In this case, a filter that is substantially transmissive of the applied infrared radiation is preferably provided in front of the camera. For further details of the CCD camera and the infrared light source, see Japanese Patent Unexamined Publication No. Hei. 5-10084 as described above.

The camera 1 forms a focused image on the CCD imaging device and the electrical signals obtained by electronic scan are A/D (analog to digital) converted to produce digital image signals, which represent the gradation of each pixel in a predetermined number of bits. In the example under consideration, the CCD imaging device forms black-and-white images but it may be replaced by a color CCD camera. In this alternative case, each pixel is composed of a sufficient number of bits to represent a color element and gradation.

An image memory 2 stores the digital image signals (hereunder referred to as "image data") that have been formed with the camera 1. The image memory 2 is composed of a semiconductor memory such as a DRAM (dynamic random access memory) or a SRAM (static random access memory). It may be replaced by a dual port memory that is on the market for an image memory.

An edge image extracting section 3 extracts image edges by executing mathematical operations on the image data stored in the memory 2. While several techniques are known to extract image edges, a Sobel filter (also known as a Sobel operator) is used in the example under consideration. This technique involves mathematical operations with a rectangular neighborhood of 3 ×3 elements. Briefly, 3 ×3 pixels in the image data that consist of a center pixel $f_{ij}$ and the adjacent, neighboring eight pixels are taken out and subjected to a product sum operation with the first Sobel filter shown in Table 1, thereby producing a pixel $g_{ij}$ corresponding to the initial pixel $f_{ij}$. This procedure is executed for all pixels to produce the first transformed image.

The product sum operation is expressed by the following equation, with $w(\Delta i, \Delta j)$ representing the Sobel filter of 3×3 elements. Details of this operation may be found in "Handbook of Television Image Information Engineering" edited by The Institute of Television Engineers of Japan, 1990, pp. 398–399:

$$g_{ij} = \sum_{\Delta i=1}^{3} \sum_{\Delta j=1}^{3} w(\Delta i, \Delta j) \cdot f_{i+\Delta i-2, j+\Delta j-2}$$

A similar product sum operation is executed with the second Sobel filter shown in Table 2 to form the second transformed image. The absolute values of the pixels in the first transformed image are added to those of the corresponding pixels in the second transformed image, thereby producing edge images as extracted from the image data. The second Sobel filter is the first Sobel filter rotated by 90°; the first Sobel filter computes the edge intensity in a vertical direction and the second Sobel filter computes the edge intensity in a horizontal direction.

TABLE 1

| -1 | 0 | 1 |
|---|---|---|
| -2 | 0 | 2 |
| -1 | 0 | 1 |

TABLE 2

| -1 | -2 | -1 |
|---|---|---|
| 0 | 0 | 0 |
| 1 | 2 | 1 |

Figure 2:
FIGS. 2(a) and 2(b) are photographs showing, instead of drawings, an image taken with a CCD camera and an image after edge extraction.
Figure 2:
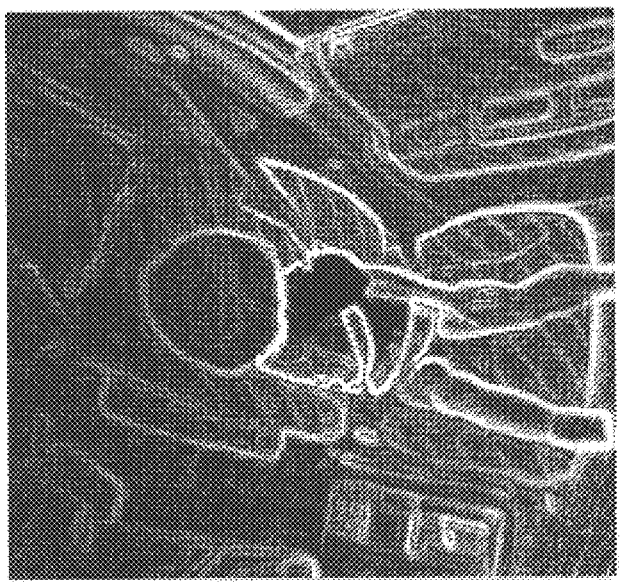

FIG. 2(a) shows the image, as taken with the camera 1, of a child seated next to the driver of an automobile. FIG. 2(b) shows the edge image produced by executing the above-described process of edge extracting operation on the image shown in FIG. 2(a). The contours of the child, his seat, the inner surface of the door, etc. are clearly seen.

The thus obtained edge image is stored in a buffer memory 9. The buffer memory 9 may be part of the image memory 2. The edge image extracting section 3 forms edge images at a given period, for example, 33 milliseconds and stores them in the buffer memory 9.

Figure 3:
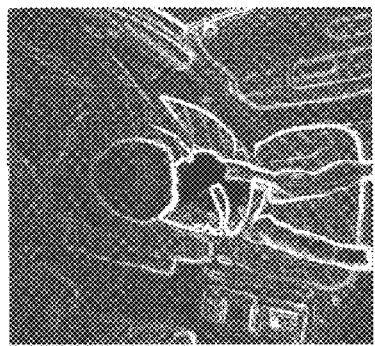
FIGS. 3(a) to 3(c) are photographs showing, instead of drawings, the process of forming a differential image from two edge images.
Figure 3:
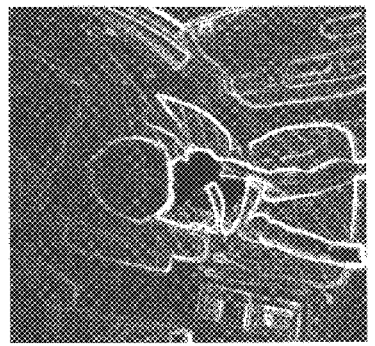
Figure 3:
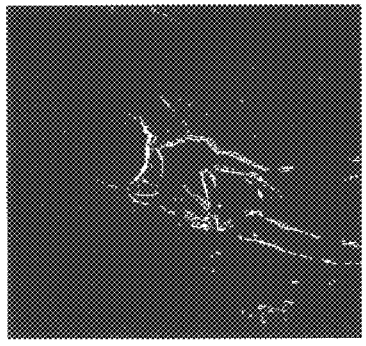

A time differential image forming section 4 takes the difference between the current edge image shown in FIG. 3(a) and the previous edge image shown in FIG. 3 (b). The edge image of FIG. 3(b) has been extracted from the image that was taken 33 milliseconds before the edge image of FIG. 3(a).

The differential image between the two edge images is formed by taking the difference between the values of corresponding pixels in the two images. This process eliminates the pixels that are equal in the two edge images. Therefore, the edge images of those portions of the object which are without motion are eliminated, leaving only the edges of the portions in motion to appear in a differential image. The thus obtained differential image is free from the edge images of portions in the background such as seats and doors and has only the passenger in motion extracted as an edge image.

A binarizing section 5 binarizes the pixels in the thus obtained differential image by classifying the pixels lighter than a predetermined threshold as white pixels (bit 1) and those darker than the same threshold as black pixels (bit 0). FIG. 3(c) shows the thus binarized differential image.

Figure 4:
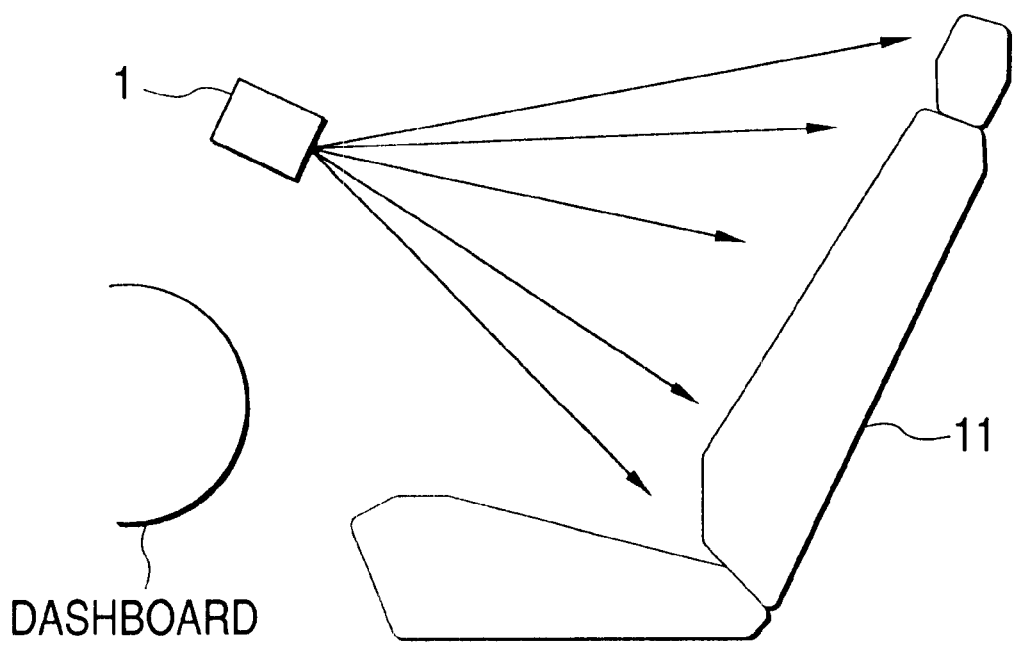
FIG. 4 is a diagram showing the relative positions of a camera and the back of a passenger seat.
Figure 5:
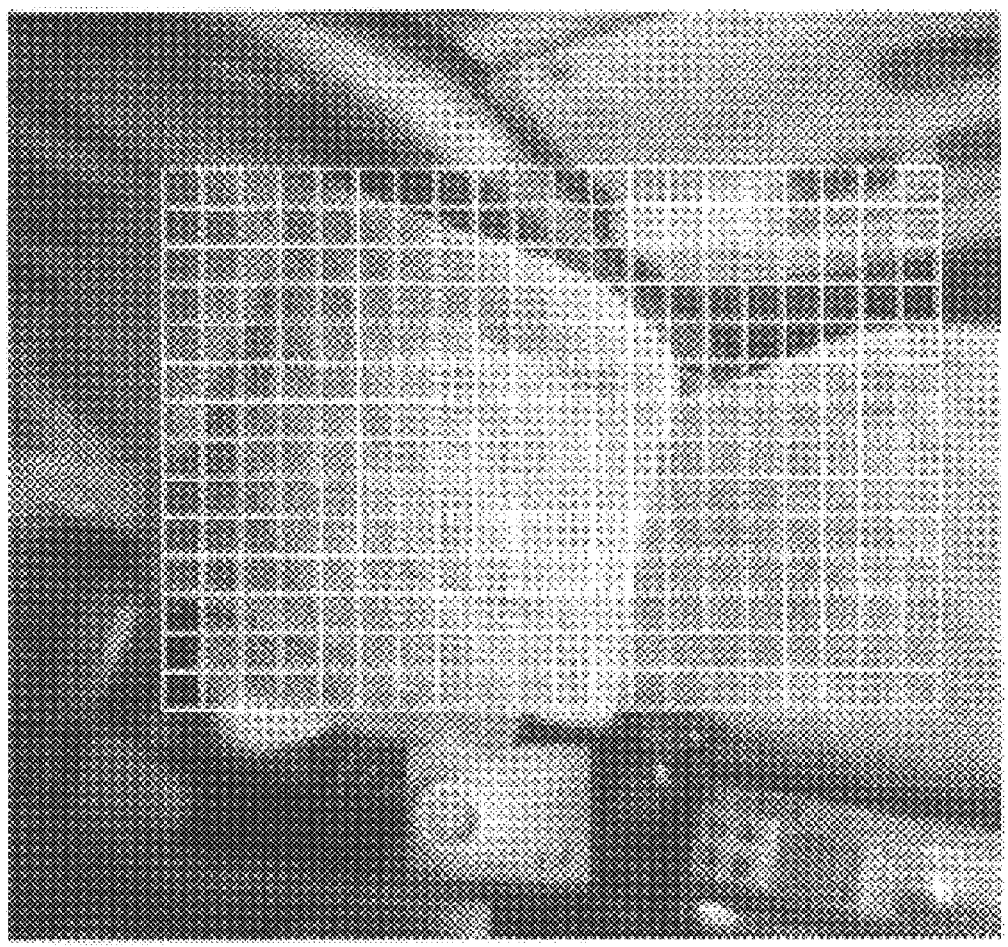
FIG. 5 is a photograph showing, instead of a drawing, a cut area of an image that is divided into smaller areas.

FIG. 4 shows the relative positions of the single-lens CD camera 1 and the back of a vehicle seat 11. In the example under consideration, the state of a passenger is detected by first cutting an area of 200×140 pixels out of the image under analysis and then dividing the area into smaller areas each consisting of 10×10 pixels to form a matrix of 20×14 small areas, as shown in FIG. 5.

Figure 6:
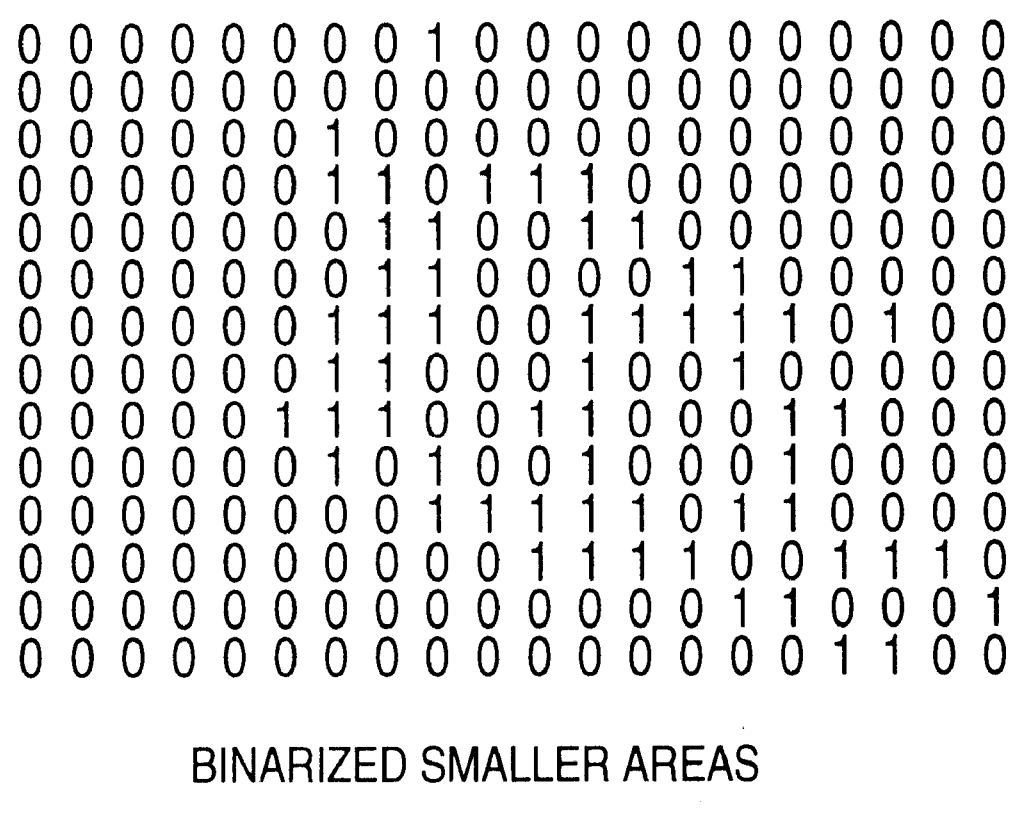

A pixel counting section 7 counts the number of white pixels in each of the small areas from the binarized differential image shown in FIG. 3(c), compares it with a predetermined threshold, for example, the number of white pixels per small area as averaged for the whole matrix, and assigns "zero" to the small areas lower than the threshold and "one" to those higher than the threshold. In this way, the individual small areas are assigned either "one" or "zero". FIG. 6 shows the matrix of 20×14 small areas that have been thus assigned either "one" or "zero".

Figure 7:
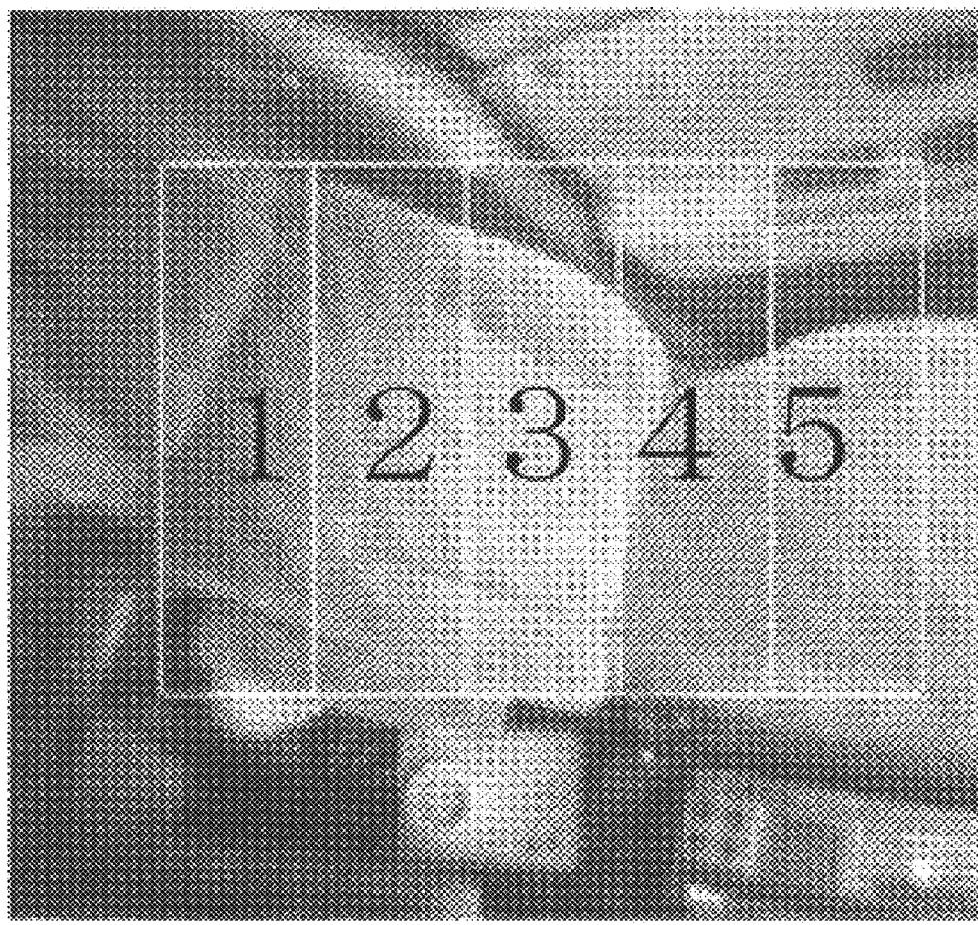
FIG. 7 is a photograph showing, instead of a drawing, a cut area of an image that is divided into rectangular areas.

A passenger state determining section 8 divides the matrix shown in FIG. 6 into five rectangular areas 1–5 shown in FIG. 7 and calculates the sum of the number of bits 1 in each rectangular area. One rectangle corresponds to four columns in the matrix shown in FIG. 6 and consists of 4×14 bits. The passenger state determining section 8 counts the number of bits 1 in each of the thus obtained rectangular areas 1–5 and determines the state of a passenger on the basis of the counted number of bits 1 in each rectangular area.

Figure 8:
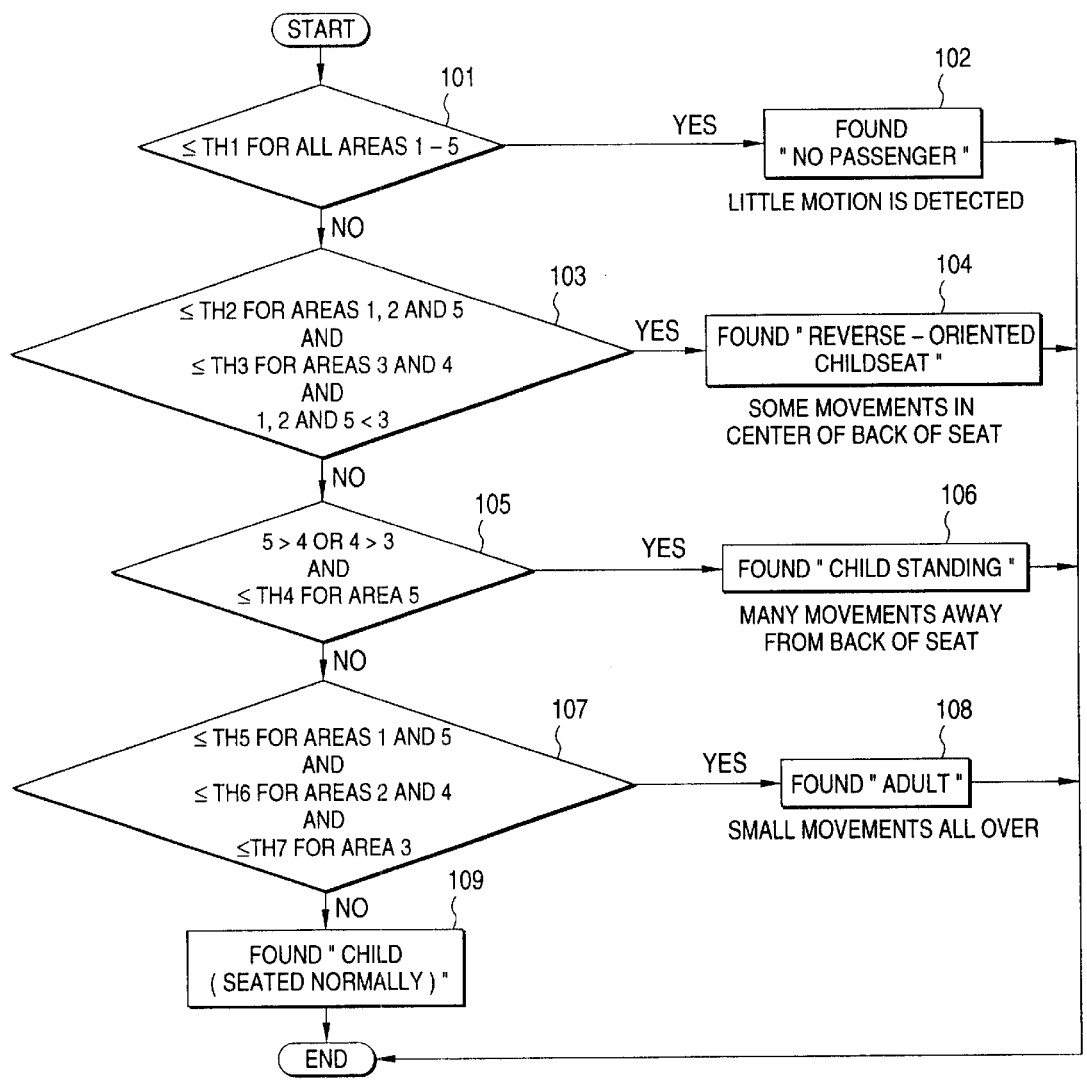
FIG. 8 is a flowchart showing an exemplary technique of determining the state of a passenger.

FIG. 8 shows an example of the algorithm that may be taken to perform the above-described determination. In FIG. 8, TH1–TH7 represent thresholds that may typically take the following values: TH1, 8; TH2, 22; TH3, 11; TH4, 10; TH5, 10; TH6, 20; and TH7, 46.

The number of bits 1 to be counted in each rectangular area is preferably the average of the values measured in a given time, for example, 10 seconds. This guarantees consistency in the results of determination.

If the number of bits 1 is equal to or smaller than TH1 for all rectangular areas 1–5 (step 101), little motion of the object is detected and hence the passenger state determining section 8 concludes that there is no passenger (step 102). If the number of bits 1 is equal to or smaller than TH2 for rectangular areas 1,2 and 5 and equal to or smaller than TH3 for rectangular areas 3 and 4 and if the number of bits 1 in rectangular areas 1, 2 and 5 is smaller than that in area 3 (step 103), small movements are found in the center of the back of a seat and, therefore, the passenger state determining section 8 finds a reverse-oriented child seat, or it concludes that the child seat is installed to face the back of the passenger seat (step 104).

If the number of bits 1 in rectangular area 5 is greater than that in area 4 or if the number of bits 1 in rectangular area 4 is greater than that in area 3 and if the number of bits 1 in area 5 is equal to or smaller than TH4 (step 105), many movements occur away from the back of the seat and, therefore, the passenger state determining section 8 finds a standing child, or it concludes that the child is standing on the seat (step 106).

If the number of bits 1 in areas 1 and 5 is equal to or smaller than TH5, that in areas 2 and 4 is equal to or smaller than TH6 and that in area 3 is equal to or smaller than TH7 (step 107), small movements occur all over and, hence, an adult is found to be seated (step 108). Otherwise, a child is found to be seated normally (step 109).

Described above is just one example of the technique that can be adopted to determine the state of passengers and many other techniques encompassed by the present invention may be conceived. For example, given the differential image shown in FIG. 3(c), a specific area corresponding to the head, arms or other parts of a passenger is cut out of the image and the state of the passenger is determined on the basis of the number of white pixels in that area.

Figure 9:
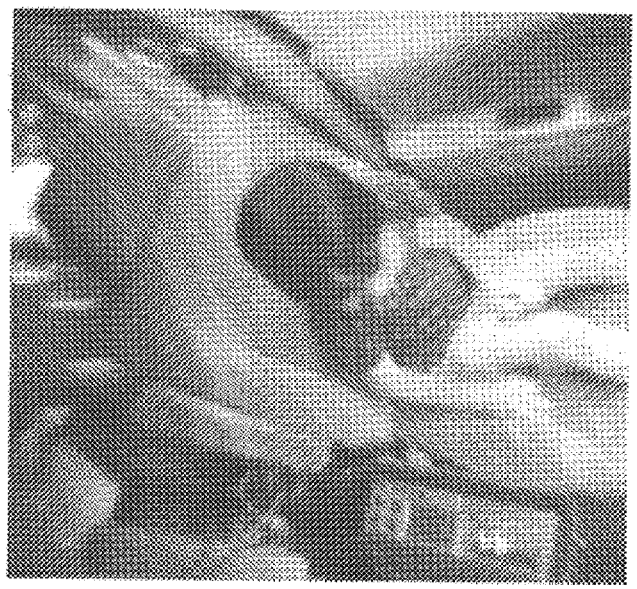
FIG. 9 is a photograph showing, instead of a drawing, another image taken with the CCD camera.
Figure 10:
FIG. 10 is a photograph showing, instead of a drawing, an image obtained by edge extraction from the image shown in FIG. 9.

The function of a head position determining section 6 shown in FIG. 1 will now be described. The image taken with the camera 1 and shown in FIG. 9 is subjected to edge extraction in the edge image extracting section 3 and on the basis of the two edge images formed with a predetermined time interval, a differential image is formed in the time differential image forming section 4 and then binarized in the binarizing section 5. The thus binarized differential image is shown in FIG. 10.

Figure 11:
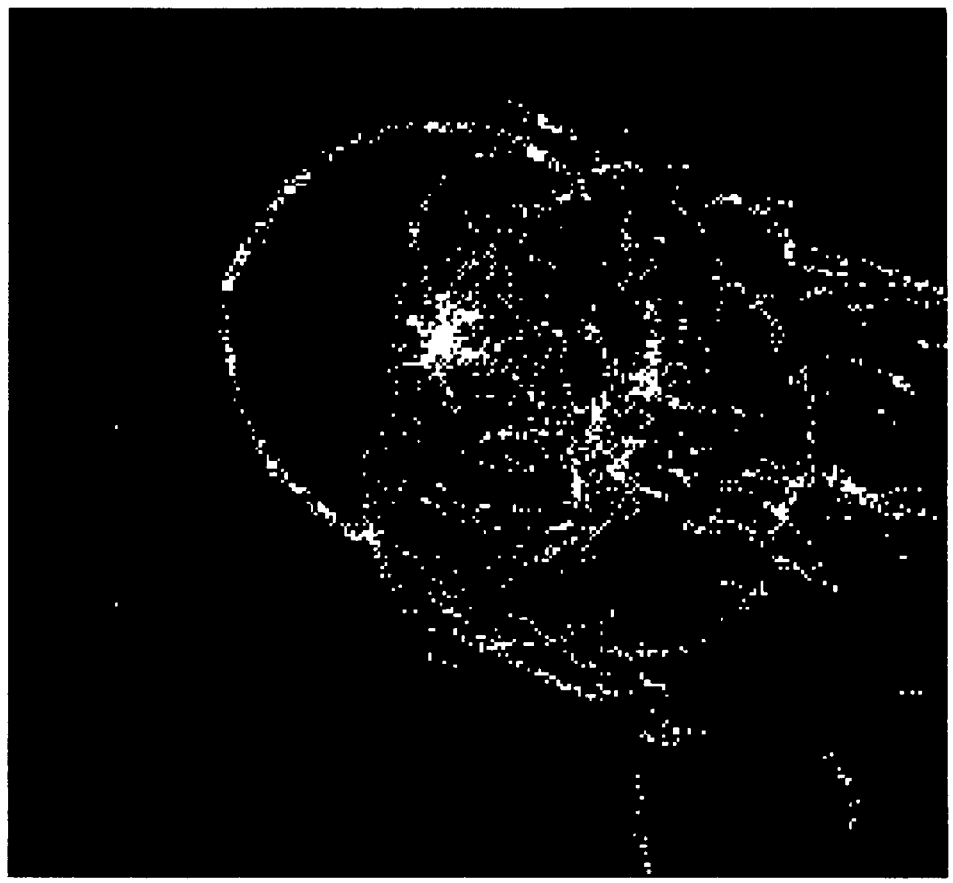
FIG. 11 is a photograph showing, instead of a drawing, flags stood for detecting the head on the basis of the image shown in FIG. 10.

In the edge image extracting section 3, mathematical operations for edge extraction are performed using the above-described Sobel filter to produce not only edge intensities as discrete points of image brightness but also edge directions (angles) . If a straight line of a predetermined length, for example, a length corresponding to the radius of a model human head, is drawn perpendicular to the orientation of an edge in opposite directions from the pixel of the edge and a flag is stood at the end of each line, many flags occur near the center of the head. FIG. 11 shows the thus obtained image of flags; obviously, the flags are concentrated in the center of the head. The head position determining section 6 scans this image to determine the area of high flag density and determines the position of a passenger's head on the basis of the position of that area.

While the present invention has been described above with particular reference to a specific example, it should be noted that the invention is by no means limited to this example only.

According to the object detecting apparatus of the invention, portions of the background without motion that are contained in the edge images are eliminated to produce edge images that only relate to an object that is substantially in motion; hence, information can be efficiently obtained that relates to the state, position and otherwise of the object in motion.

What is claimed is:

1. An object detecting apparatus comprising:
   imaging means for imaging an object;
   extracting means for extracting edge images from image signals supplied from said imaging means;
   forming means for forming a differential image between a first of the edge images and a second of the edge images as extracted from image signals based on images that have been imaged by the imaging means at different times;
   refining means for dividing the differential image into a predetermined plurality of image areas, each of said plurality of image areas containing a plurality of pixels wherein each of said image area has a value associated therewith; and
   detecting means for detecting a state of the object on the basis of a comparison between the value of each of said image areas and a threshold value.

2. The object detecting apparatus according to claim 1, which is to be installed on a vehicle and wherein said detecting means includes state determining means for determining a state of a passenger.

3. The object detecting apparatus according to claim 1, which is to be installed on a vehicle and wherein said detecting means includes head position determining means for determining a position of a head of a passenger from a shape of the differential image.

4. The object detecting apparatus of claim 1, wherein each of said pixels of said plurality of pixels has a binary value.

5. The object detecting apparatus of claim 4, wherein said refining means compares the binary value for at least one of said pixels of said plurality of pixels to a threshold value to determine an average binary value said average binary value being assigned to said pixel.

6. The object detecting apparatus of claim 5, wherein said value associated with each of said plurality of image areas is representative of a summation of said average binary values assigned to one or more of said plurality of pixels.

7. The object detecting apparatus of claim 1, wherein said refining means determine said value associated with said predetermined plurality of image areas by summing an average value of said plurality of pixels contained in each of said predetermined plurality of image areas.

8. The object detecting apparatus of claim 7, wherein said binary value for a selected one or more pixels of each of said plurality of pixels is compared to a threshold value to determine an average binary value for said selected one or more pixels.

9. An object detecting apparatus comprising:
   an imaging device for imaging an object;
   an extracting module for extracting edge images from image signals supplied from said imaging means;
   a forming module for forming a differential image between a first of the edge images containing a first edge image of the object and a second of the edge images containing a second edge image of the object as extracted from the image signals based on images of the object that have been imaged by the imaging means at different times;
   a refining module for dividing the differential image into a predetermined plurality of image areas, each of said plurality of image areas containing a plurality of pixels wherein each of said image areas has a value associated; and
   a detecting module for detecting motion of the object on the basis of a comparison between values obtained from each of said image areas in the differential image and a threshold value.

10. The object detecting apparatus of claim 9, wherein each pixel in said plurality pixel has a binary value.

11. The object detecting apparatus of claim 10, wherein said value associated with each of said plurality of image areas is representative of a summation of one or more of said average binary values for said selected one or more pixels.

12. The object detecting apparatus of claim 9, wherein said refining means determine said value associated with said predetermined plurality of image areas by summing an average value of said plurality of pixels contained in each of said predetermined plurality of image areas.

* * * * *